United States Patent
Chin et al.

(10) Patent No.: US 9,872,261 B2
(45) Date of Patent: Jan. 16, 2018

(54) METHOD AND APPARATUS FOR IMPROVING SYNCHRONIZATION SHIFT COMMAND TRANSMISSION EFFICIENCY IN TD-SCDMA UPLINK SYNCHRONIZATION

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 789 days.

(21) Appl. No.: 13/508,431

(22) PCT Filed: Apr. 12, 2010

(86) PCT No.: PCT/US2010/030773
§ 371 (c)(1),
(2), (4) Date: Jul. 17, 2012

(87) PCT Pub. No.: WO2011/071556
PCT Pub. Date: Jun. 16, 2011

(65) Prior Publication Data
US 2012/0281682 A1    Nov. 8, 2012

Related U.S. Application Data

(60) Provisional application No. 61/267,309, filed on Dec. 7, 2009.

(51) Int. Cl.
*H04W 56/00*   (2009.01)
(52) U.S. Cl.
CPC .................. *H04W 56/00* (2013.01)

(58) Field of Classification Search
CPC ........................................ H04W 56/00
See application file for complete search history.

(56) References Cited

U.S. PATENT DOCUMENTS

| | | | | |
|---|---|---|---|---|
| 5,909,433 A * | 6/1999 | Haartsen | | 370/337 |
| 6,005,854 A * | 12/1999 | Xu | | H04B 7/2668 370/335 |
| 6,108,322 A * | 8/2000 | Kotzin | | H04W 36/0094 370/333 |
| 6,684,079 B1 * | 1/2004 | Aretz | | H04B 7/26 370/335 |
| 7,139,225 B2 * | 11/2006 | Farmer | | 455/456.1 |
| 7,480,273 B1 * | 1/2009 | Raaf | | H04W 36/0088 370/331 |

(Continued)

FOREIGN PATENT DOCUMENTS

| CA | 2527929 A1 | 10/2001 |
|---|---|---|
| CN | 101047435 A | 10/2007 |
| CN | 101499846 A | 8/2009 |

OTHER PUBLICATIONS

Taiwan Search Report—TW099112589—TIPO—dated Jan. 8, 2014.

(Continued)

*Primary Examiner* — Chirag Shah
*Assistant Examiner* — Joshua Smith
(74) *Attorney, Agent, or Firm* — Holland & Hart

(57) ABSTRACT

A method of wireless communication includes receiving a signal associated with a frequency for adjusting timing and adjusting the timing based on the frequency. The frequency is less than once every 8 subframes.

10 Claims, 9 Drawing Sheets

(56) References Cited

U.S. PATENT DOCUMENTS

| | | | |
|---|---|---|---|
| 7,698,428 B2 * | 4/2010 | Fatula, Jr. | H04L 67/1095 709/204 |
| 8,014,378 B1 * | 9/2011 | Yoon | H04W 4/00 370/324 |
| 8,233,470 B2 * | 7/2012 | Yang | H04W 56/00 370/350 |
| 2002/0021718 A1 * | 2/2002 | Kerhuel | H04B 7/2681 370/509 |
| 2002/0054583 A1 * | 5/2002 | Olesen et al. | 370/336 |
| 2003/0117980 A1 * | 6/2003 | Kim et al. | 370/332 |
| 2003/0186700 A1 * | 10/2003 | Torsner | H04W 36/06 455/442 |
| 2004/0042501 A1 * | 3/2004 | Hester | H04W 52/0216 370/509 |
| 2004/0174845 A1 * | 9/2004 | Koo | H04W 36/0055 370/328 |
| 2004/0202117 A1 * | 10/2004 | Wilson | H04L 12/1827 370/310 |
| 2005/0032542 A1 * | 2/2005 | Wilborn et al. | 455/525 |
| 2006/0029031 A1 | 2/2006 | Koorapaty | |
| 2006/0072509 A1 * | 4/2006 | Lindoff | H04W 72/005 370/332 |
| 2006/0154603 A1 * | 7/2006 | Sachs | H04L 1/1635 455/39 |
| 2006/0258383 A1 * | 11/2006 | Jiang | H04W 56/0045 455/502 |
| 2006/0269028 A1 * | 11/2006 | Bley | H04W 56/001 375/354 |
| 2007/0054691 A1 * | 3/2007 | Sankar et al. | 455/522 |
| 2007/0110046 A1 * | 5/2007 | Farrell | H04L 69/04 370/389 |
| 2007/0207740 A1 * | 9/2007 | Dickey | H04B 17/318 455/67.11 |
| 2007/0286121 A1 * | 12/2007 | Kolakowski et al. | 370/329 |
| 2009/0040998 A1 * | 2/2009 | Park | 370/345 |
| 2009/0168745 A1 * | 7/2009 | Ahmadi | H04L 27/2613 370/350 |
| 2009/0196279 A1 * | 8/2009 | Kim et al. | 370/350 |
| 2009/0274120 A1 * | 11/2009 | Chou | H04L 5/003 370/331 |
| 2010/0029291 A1 * | 2/2010 | Angelow | H04B 7/2681 455/450 |
| 2010/0137013 A1 * | 6/2010 | Ren | H04W 76/048 455/500 |
| 2010/0151850 A1 * | 6/2010 | Majmundar | H04L 69/32 455/423 |
| 2010/0304706 A1 * | 12/2010 | Haverty | 455/404.1 |
| 2011/0002251 A1 * | 1/2011 | Shin | H04J 3/0679 370/311 |
| 2011/0244873 A1 * | 10/2011 | Lee et al. | 455/450 |
| 2011/0268016 A1 * | 11/2011 | Youn | H04L 5/0003 370/315 |

OTHER PUBLICATIONS

3GPP Group Radio Access Network: "Physical channels and mapping of transport channelsonto physical channels (TDD) (Release 8)", 3rd Generation Partnership Project (3GPP); Technicalspecification (TS), XX, XX, TS 25.221, V8.6.0, Sep. 1, 2009 (Sep. 1, 2009), pp. 57-99, XP002591595.

3GPP TS25.224 V8.5.0(Sep. 2009), Physical layer procedures (TDD), 3GPP, Sep. 30, 2009, pp. 39-40.

"3rd Generation Partnership Project; Technical Specification Group Radio Access Network; UTRA TDD Low Chip Rate Option Radio Protocol Aspects (Release 2000)", 3GPP Standard; 3G TR 25. 834, 3rd Generation Partnership Project (3GPP), Mobile Competence Centre ; 650, Route Des Lucioles ; F-06921 Sophia-Antipolis Cedex ; France, No. V1.0.0, Sep. 1, 2000 (Sep. 1, 2000), pp. 1-38, XP050369195.

Chapter 5.2: "UL Synchronisation" In: 3GPP RAN: "3GPP TS 25.224 V8.5.0", Sep. 1, 2009 (Sep. 1, 2009), 3GPP, XP002591335, pp. 40-42.

Dahlmann, E at al.,"3GEvolution: HSPA and LTE for Mobile Broadband, passage", Jun. 1, 2008 (Jun. 1, 2008), 3G Evolution : HSPA and LTE for Mobile Broadband, Academic Press in Elsevier, NL, pp. 490-495, XP002591334, ISBN: 978-0-12-374538-5 paragraph [19.5].

International Search Report and Written Opinion—PCT/US2010/030773, International Search Authority—European Patent Office—dated Jan. 19, 2011.

Universal Mobile Telecommunications System (UMTS); Low chip rate TDD lub/lur protocol aspects (3GPP TR 25.937 version 4.1.0 Release 4); ETSI TR 125 937, ETSI Standards, LIS, Sophia Antipolis Cedex, France, vol . 3-R3, No. V4.1.0, Sep. 1, 2001 (Sep. 1, 2001), XP014005125, ISSN: 0000-0001.

* cited by examiner

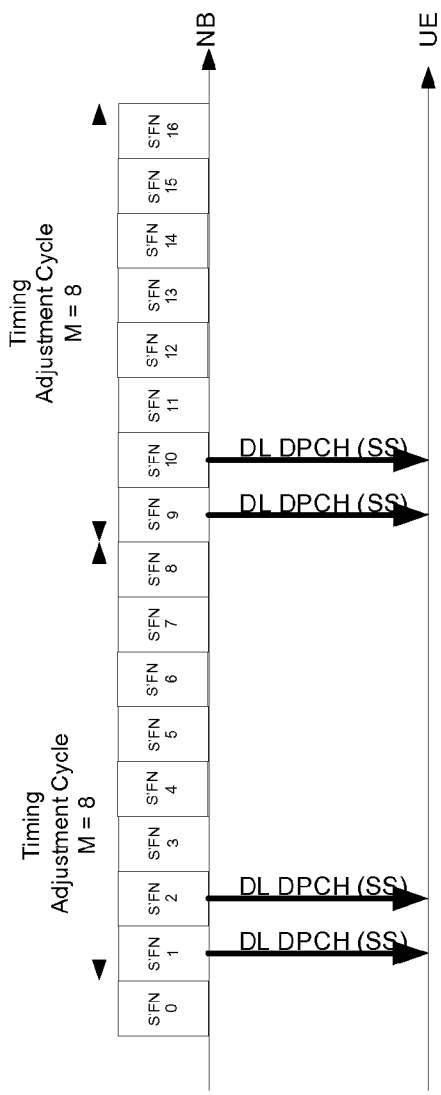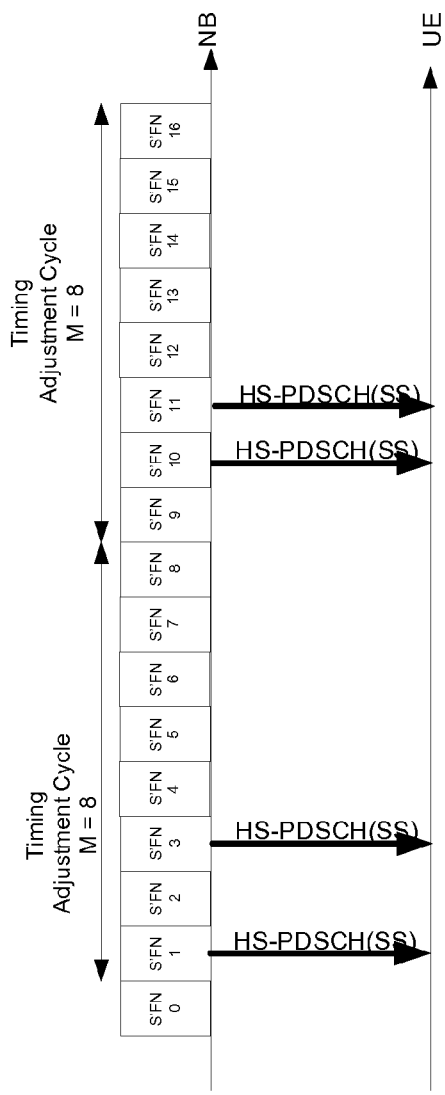

METHOD AND APPARATUS FOR IMPROVING SYNCHRONIZATION SHIFT COMMAND TRANSMISSION EFFICIENCY IN TD-SCDMA UPLINK SYNCHRONIZATION

CROSS-REFERENCE TO RELATED APPLICATION(S)

This application claims the benefit of U.S. Provisional Patent Application No. 61/267,309, entitled "A METHOD TO IMPROVE THE SYNCHRONIZATION SHIFT COMMAND TRANSMISSION EFFICIENCY IN TD-SCDMA UPLINK SYNCHRONIZATION", filed on Dec. 7, 2009, which is expressly incorporated by reference herein in its entirety.

BACKGROUND

Field

Aspects of the present disclosure relate generally to wireless communication systems, and more particularly, to a method and apparatus for improving the synchronization shift (SS) command transmission efficiency in Time Division-Synchronous Code Division Multiple Access (TD-SCDMA) uplink (UL) synchronization.

Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications. One such advance is to improve the SS command transmission efficiency in TD-SCDMA UL synchronization.

SUMMARY

In an aspect of the disclosure, a method, an apparatus, and a computer program product for wireless communication are provided in which a signal associated with a frequency for adjusting timing is received. In addition, the timing is adjusted based on the frequency. The frequency is less than once every 8 subframes.

In an aspect of the disclosure, a method, an apparatus, and a computer program product for wireless communication are provided in which at least one synchronization shift command is received in N subframes of a timing adjustment cycle including M subframes. N and M are positive integers and N is less than M.

In an aspect of the disclosure, a method, an apparatus, and a computer program product for wireless communication are provided in which non-control data are received between a midamble and a transmit power control field in a single timeslot of a subframe.

BRIEF DESCRIPTION OF THE DRAWINGS

FIG. 5A is a conceptual diagram illustrating limited SS command transmission in the beginning of the timing adjustment cycle with the number of SS commands per cycle N equal to 2.

FIG. 5B is another conceptual diagram illustrating limited SS command transmission in the beginning of the timing adjustment cycle with the number of SS commands per cycle N equal to 2.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
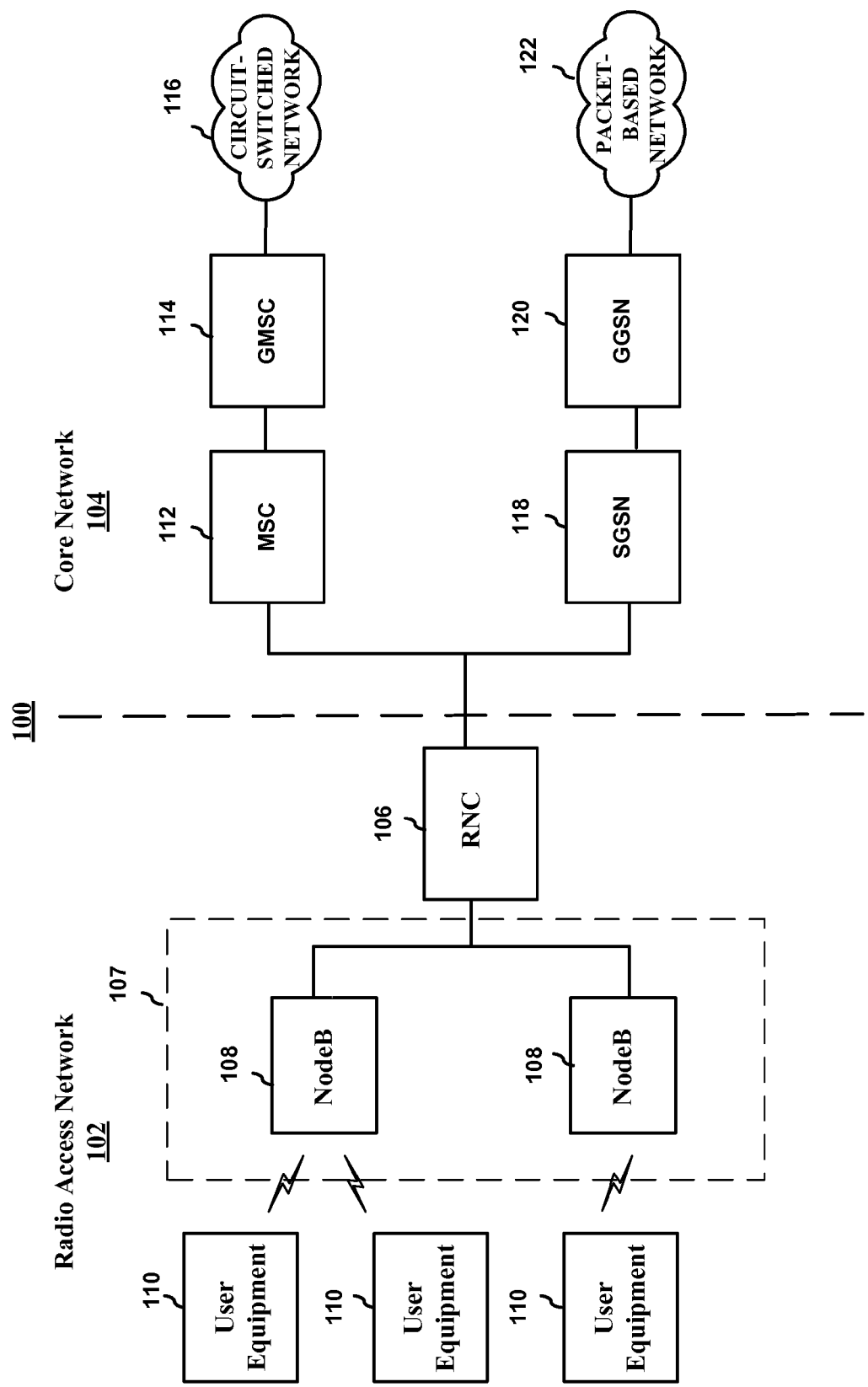
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For the sake of clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a smartbook, a personal digital assistant (PDA), a satellite radio, a global positioning system (GPS) device, a multi-media device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
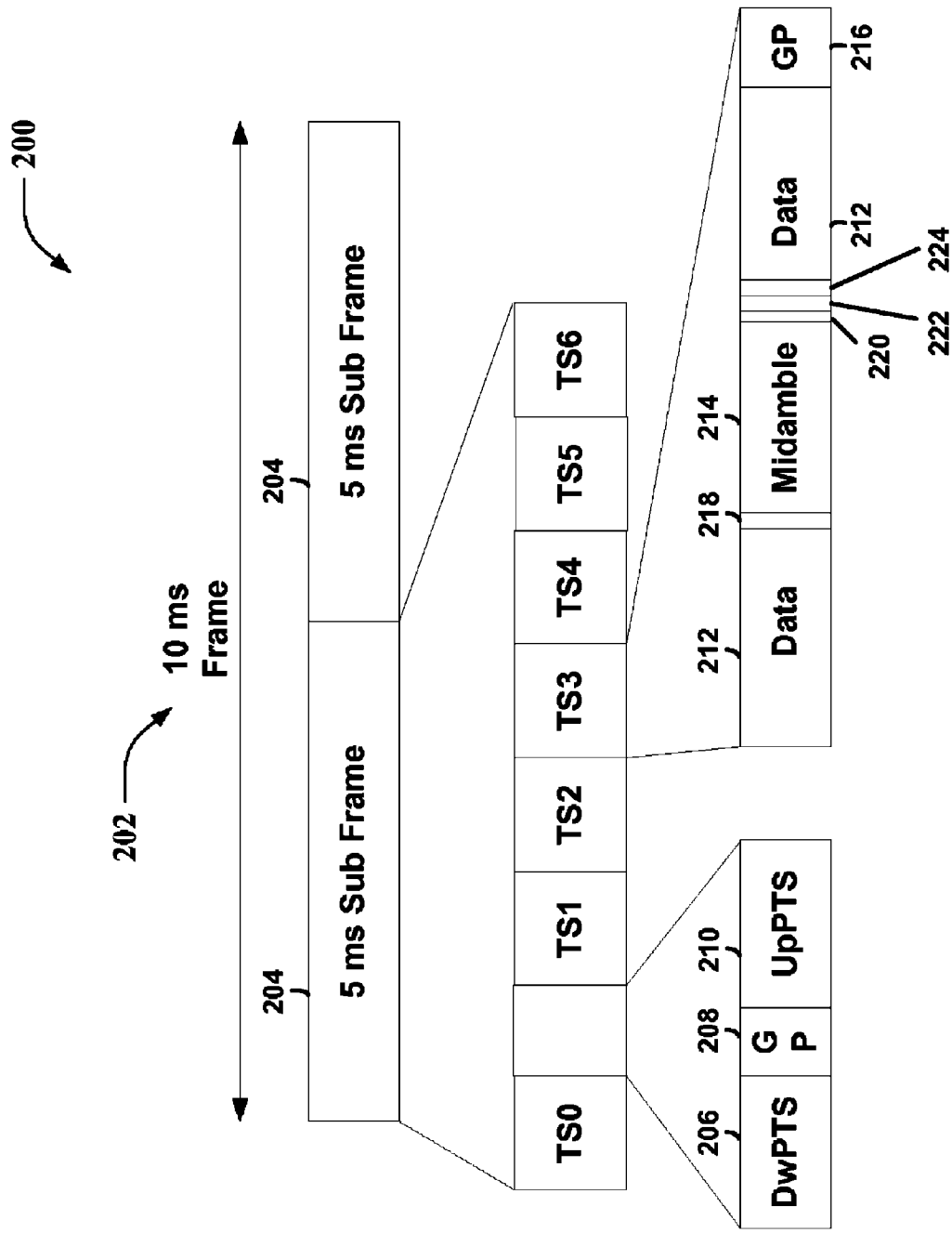
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference. Layer 1 control information is transmitted in the data portions 212, such as Transport Format Combination Indication (TFCI) 218 and 224, Transmit Power Control (TPC) 222, and Synchronization Shift (SS) 220. The SS command appears immediately after the midamble.

Figure 3:
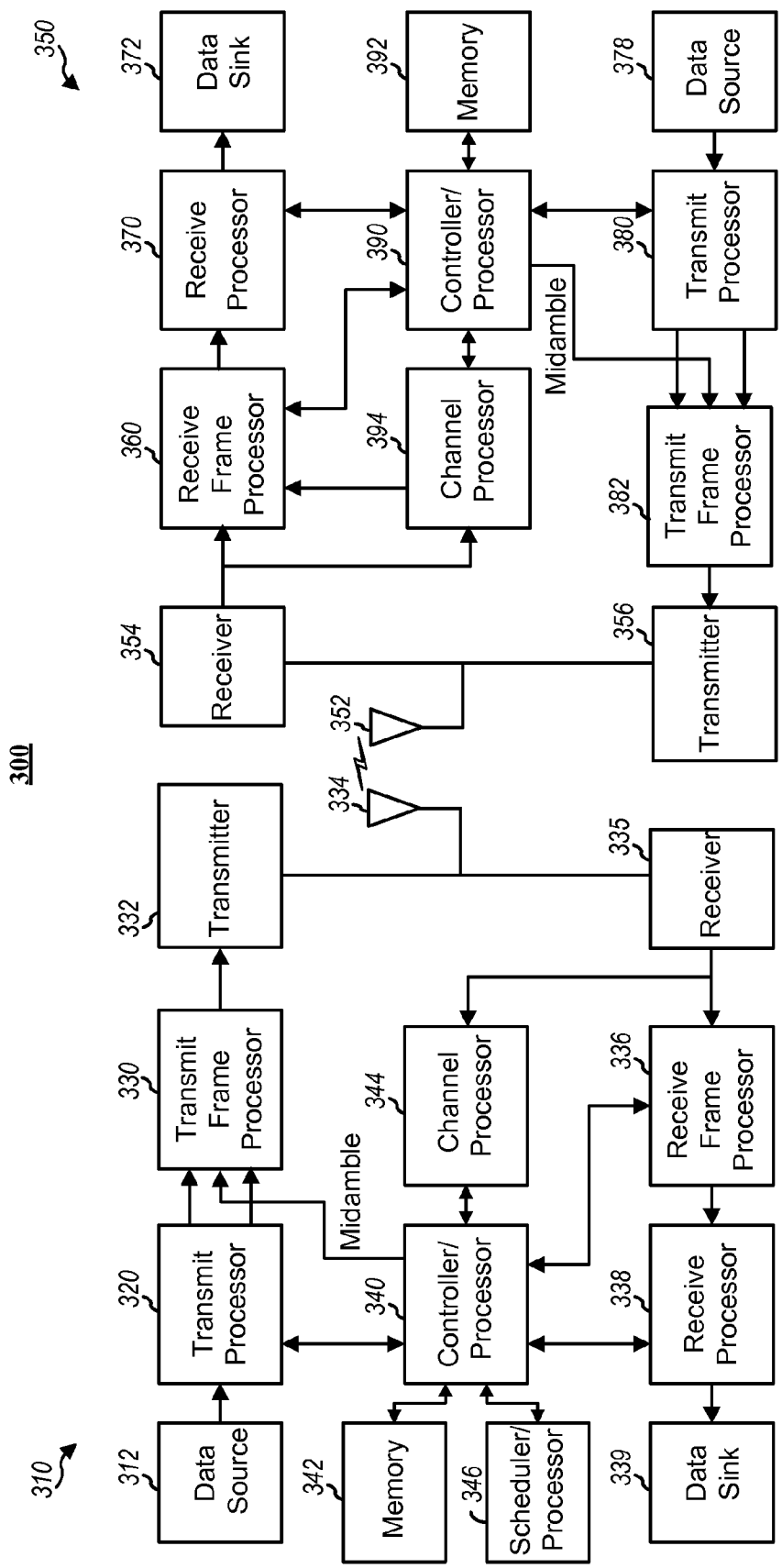
FIG. 3 is a block diagram conceptually illustrating an example of a Node B in communication with a UE in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

Referring again to FIG. 2, the SS command can indicate three commands: (1) up (shift to an earlier synchronization time), (2) down (shift to a later synchronization time), or (3) do nothing (no synchronization time shift). The up/down step value, or the "UL synchronization step size" k in multiple ⅛ chips, is configured in the Radio Resource Control (RRC) messages, such as PHYSICAL CHANNEL RECONFIGURATION, RADIO BEARER RECONFIGURATION, RRC CONNECTION SETUP, etc.

The timing adjustment takes place in the subframe satisfying the following equation:

$$S'FN \bmod M = 0,$$

where S'FN is the system subframe number. The parameter M is an "UL synchronization frequency" which can be 1 to 8 subframes. The parameter is configured in the RRC messages, such as PHYSICAL CHANNEL RECONFIGURATION, RADIO BEARER RECONFIGURATION, RRC CONNECTION SETUP, etc.

The Node B continuously measures the received UL timing from the UE and sends the necessary SS commands in each subframe.

Some rules are used for distributing the SS commands on the DL to the UL time slots. In particular, the following equation is used to determine the UL time slot which is controlled by the regarded SS symbol:

$$ULpos = (S'FN*Nss + SSpos + ((S'FN*Nss + SSpos) \operatorname{div} N_{ULTS})) \bmod N_{ULTS} \quad (1)$$

Where:
ULpos is the position of the controlled UL time slot.
S'FN is the system subframe number.
Nss is the number of SS commands in a subframe.
SSpos is the index of the regarded SS command within the subframe.
$N_{ULTS}$ is the number of UL slots in a subframe.

However, the SS commands currently defined in the standards have some disadvantages.

First, multiple UL physical channels can be allocated to the UE. For example, the UE can be allocated with the UL Dedicated Physical Channel (DPCH) for voice and the E-DCH Physical Uplink Channel (E-PUCH) for the data. It is possible that according to equation (1), the UE may need to adjust the UL transmission for these two physical channels in different timing adjustment values of the subframe. However, it is complicated for the UE to do so. To reduce complexity, the UE may only need to maintain one UL transmission timing across all physical channels on different UL time slots (TSs) within the subframe.

Second, supporting the rules for distributing the SS commands in (1) to the corresponding UL time slot can increase complexity at both the Node B and the UE.

Third, the UE can receive multiple SS commands per timing adjustment cycle, M, which can only apply to one adjustment per M subframes. Allocation of SS bits per allocated physical channel per subframe can allow the Node B to transmit the same commands repetitively. However, it may waste the bandwidth for duplicated transmission.

Fourth, the maximum value of the timing adjustment cycle M is equal to 8 and therefore the lowest frequency for the UE to adjust the SS commands is every 8 subframes. The SS commands generally respond to the moving speed of the UE. If the UE can move as fast as 300 km/hr, it is equivalent to a time shift of 8 subframes*5 ms/subframe*300,000 m/hr/3,600,000 ms/hr=3.3 meter. That is, the UL timing can shift by the amount of 3.3 m/300,000,000 m/s*1.28 Mcps=0.014 chip. The small amount of UL timing drift cannot warrant adjustment. If the granularity of time adjustment step=⅛ chip, the timing adjustment cycle can become as large as 0.125 chip/0.014 chip*8 subframes=70 subframes. Therefore, M can be selected as large as 70 subframes at the highest speed before a ⅛ chip adjustment is needed.

Methods for improving the SS commands transmission efficiency are provided. In a first configuration, the timing adjustment M is increased to be more than the currently defined maximum. For example, M can up to 64 subframes. In a second configuration, instead of sending the SS commands on each physical channel in each subframe, the SS commands are only sent in the first few physical channels N after timing adjustment, which occurs in subframe number j*M for integer j. Therefore, there are at most N commands per cycle of M subframes.

Alternatively, the Node B can only send at most N SS commands in the last few physical channels right before the timing adjustment, which occurs in subframe number j*M for integer j. Therefore, there are at most N commands per cycle of M subframes.

To facilitate the decoding of a subframe, the network can transmit the following parameters to the UE, including:
a flag indicating
SS commands are constantly transmitted as of current standards;
SS commands are limited transmitted in a few opportunities before timing adjustment; or
SS commands are limited transmitted in a few opportunities after timing adjustment.
N as the number of continuous SS commands in case of limited SS command transmission.
The above parameters can be transmitted in the RRC messages, including:
RRC CONNECTION SETUP,
PHYSICAL CHANNEL SETUP or RECONFIGURATION, or
RADIO BEARER SETUP or RECONFIGURATION.

When there is no SS commands transmission, the Node B can use those bits for SS commands to transmit DL data instead.

Figure 4:
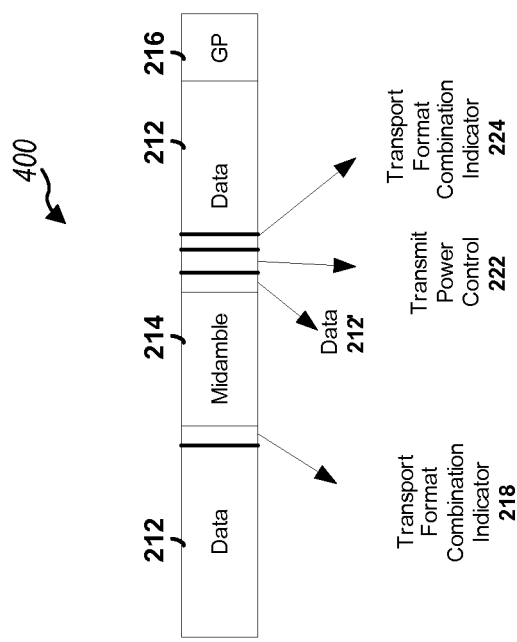
FIG. 4 is a block diagram conceptually illustrating a new format for the data and midamble portions.

FIG. 4 shows a new format 400 for the data and midamble portions for the second configuration. When the SS command 220 (see FIG. 2) is not transmitted, data 212' may be transmitted in its place. That is, non-control related data 212' may be transmitted when an SS command 220 is not transmitted. The UE can receive an RRC message to know that only limited SS commands are transmitted in each M subframe of the timing adjustment cycle. The UE can know when to decode the data frame using the new format.

FIG. 5A and FIG. 5B show a concept of limited SS command transmission in the beginning of the timing adjustment cycle with the number of SS commands per cycle N equal to 2. As indicated in FIG. 5A and FIG. 5B, the UE's timing adjustment cycle M is equal to 8, and therefore the UE adjusts the synchronization shift in subframes j*8 for integer j. Two adjustment cycles are shown in the figures, with timing adjustments being performed in subframes 0, 8, and 16. As shown in FIG. 5A, SS commands are sent in the DL PDCH in DL transmission subframes (i.e., in subframes 1, 2, 9, and 10) immediately after the UE adjusts its synchronization shift. Generally, for DL PDCH, all the subframes may be DL transmission subframes and the SS commands may be sent in subframes j*M+1, . . . , j*M+N. For HSDPA, depending on data burst allocation, the Node B may not transmit to the UE in each subframe. As shown in FIG. 5B, subframes 2 and 9 are assumed not to be DL transmission subframes. As such, the SS commands are transmitted in the HS-PDSCH (High-Speed Physical DL Shared Channel) in the DL transmission subframes immediately after the UE adjusts its synchronization shift, which in this example, are subframes 1, 3, 10, and 11.

Figure 6A:
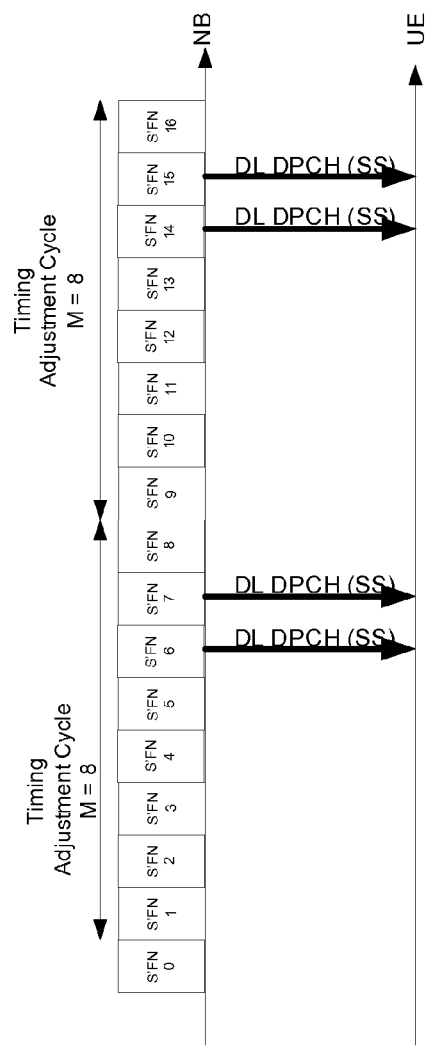
FIG. 6A is a conceptual diagram illustrating limited SS command transmission in the end of the timing adjustment cycle with the number of SS commands per cycle N equal to 2.
Figure 6B:
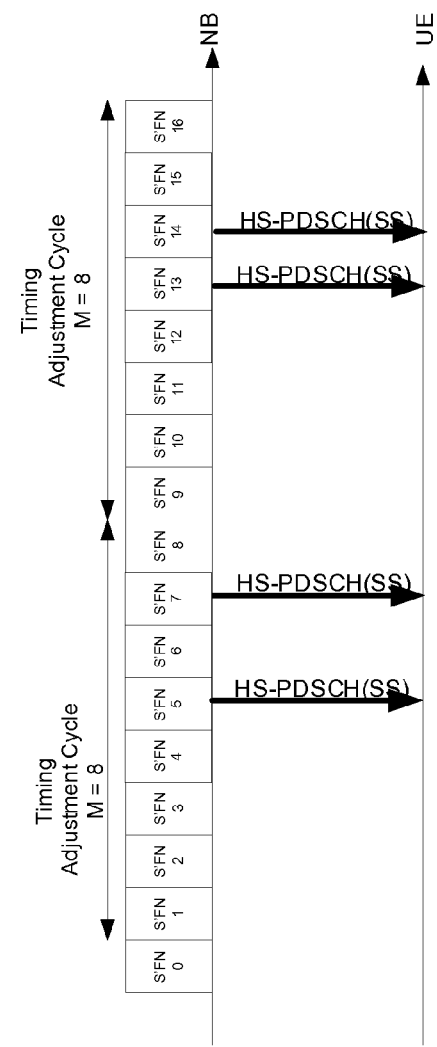
FIG. 6B is another conceptual diagram illustrating limited SS command transmission in the end of the timing adjustment cycle with the number of SS commands per cycle N equal to 2.

FIG. 6A and FIG. 6B show the concept of limited SS command transmission in the end of the timing adjustment cycle with the number of SS commands per cycle N equal to 2. As indicated in FIG. 6A and FIG. 6B, the UE's timing adjustment cycle M is equal to 8, and therefore the UE adjusts the synchronization shift in subframes j*8 for integer j. Two adjustment cycles are shown in the figures, with timing adjustments being performed in subframes 0, 8, and 16. As shown in FIG. 6A, SS commands are sent in the DL PDCH in DL transmission subframes (i.e., in subframes 6, 7, 14, and 15) immediately before the UE adjusts its synchronization shift. Generally, for DL PDCH, all the subframes may be DL transmission subframes and the SS commands may be sent in subframes j*M−1, . . . , j*M−N. For HSDPA, depending on data burst allocation, the Node B may not transmit to the UE in each subframe. As shown in FIG. 6B, subframes 6 and 15 are assumed not to be DL transmission subframes. As such, the SS commands are transmitted non-deterministically in the HS-PDSCH in the DL transmission subframes immediately before the UE adjusts its synchronization shift, which in this example, are subframes 5, 7, 13, and 14.

Because the Node B may not deterministically transmit SS commands to the UE in HSDPA, UE processing to decode with the new format can be more complex. For HSDPA, limited SS command transmission in the beginning of the timing adjustment cycle is more preferred than in the end. For DPCH, SS commands can be transmitted in the beginning or the end of the timing adjustment cycle.

The proposed configurations can improve the efficiency of the synchronization shift command transmission by avoiding unnecessary adjustment of UL timing by increasing the duration of the timing adjustment cycle and reducing processing by eliminating the SS commands distribution in equation (1).

Figure 7:
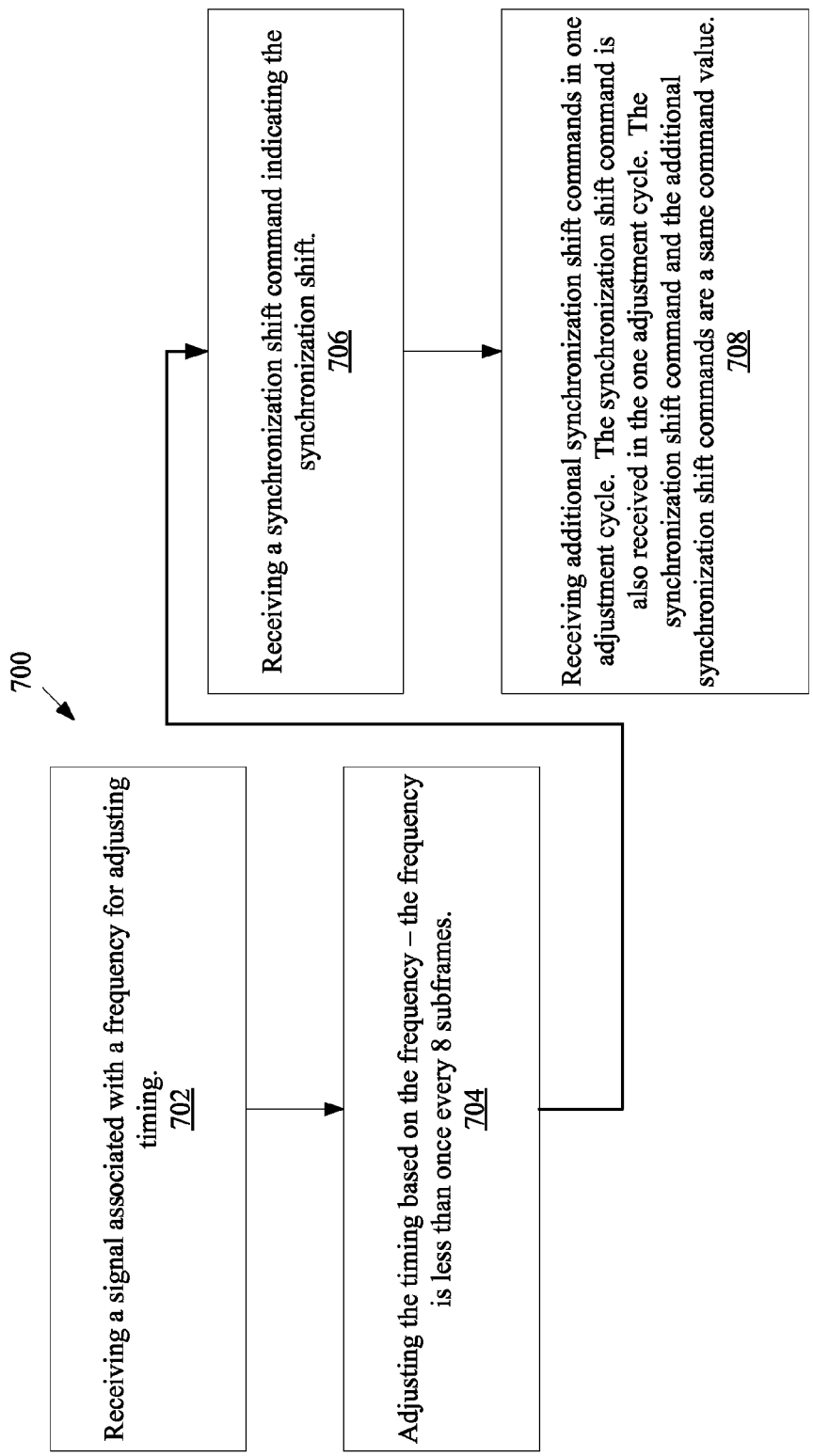
FIG. 7 is a flow chart of an exemplary method of wireless communication.

FIG. 7 is a flow chart 700 of an exemplary method of wireless communication. The method includes receiving a signal associated with a frequency for adjusting timing (702) and adjusting the timing based on the frequency (704). The frequency is less than once every 8 subframes (704). In one configuration, the frequency is an uplink synchronization frequency, the timing is a synchronization shift, and the receiving the signal comprises receiving a message comprising the uplink synchronization frequency indicating the frequency for adjusting the synchronization shift. In one configuration, the method further includes receiving a synchronization shift command indicating the synchronization shift (706). In one configuration, the method further includes receiving additional synchronization shift commands in one adjustment cycle (708). The synchronization shift command is also received in the one adjustment cycle (708). The synchronization shift command and the additional synchronization shift commands are a same command value (708). In one configuration, the adjusting the timing includes adjusting the synchronization shift based on the synchronization shift command once every M subframes, where M is the uplink synchronization frequency and is greater than 8.

Figure 8:
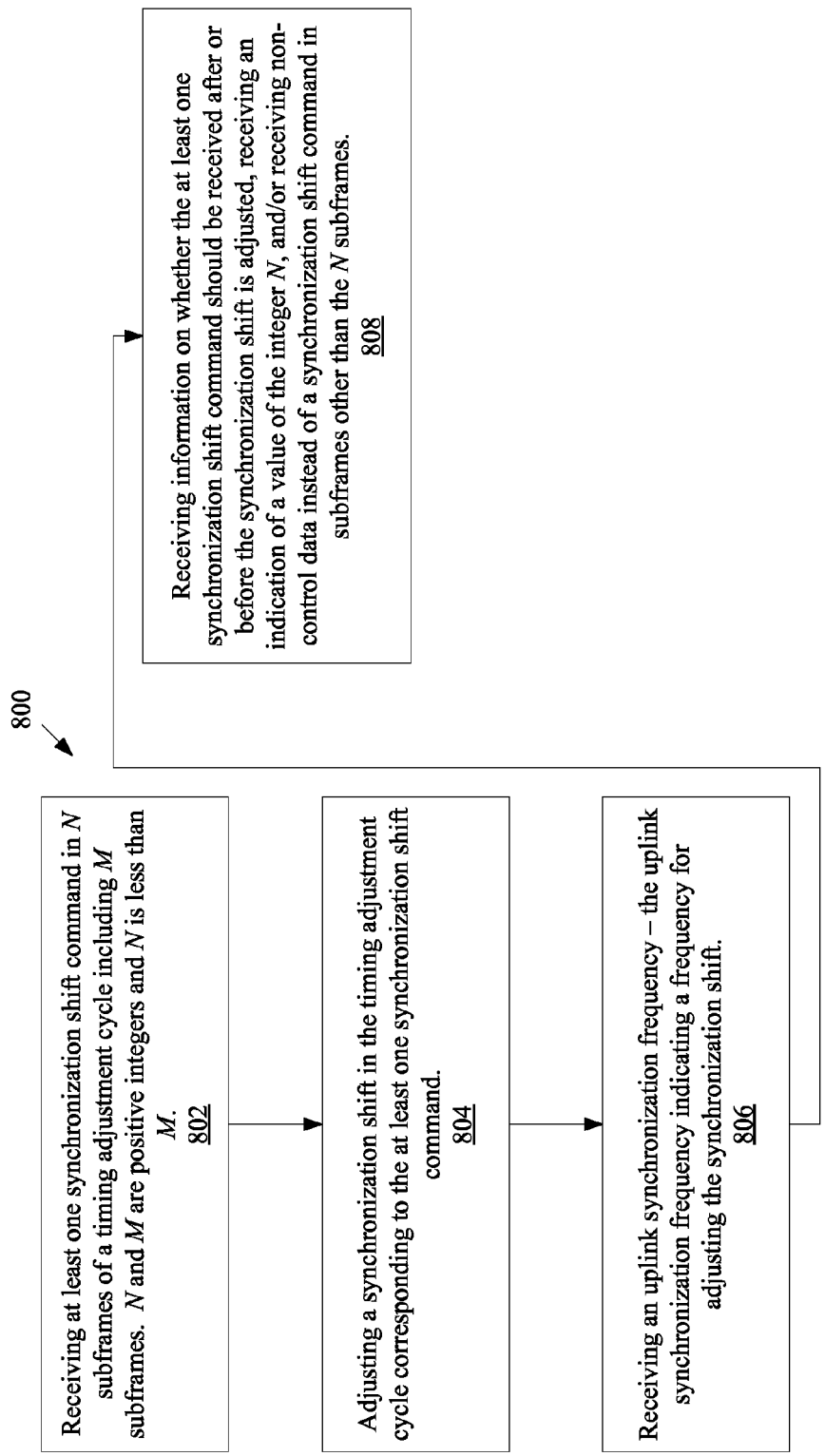
FIG. 8 is another flow chart of an exemplary method of wireless communication

FIG. 8 is another flow chart 800 of an exemplary method of wireless communication. The method includes receiving at least one synchronization shift command in N subframes of a timing adjustment cycle including M subframes (802). N and M are positive integers and N is less than M (802). The method may further includes adjusting a synchronization shift in the timing adjustment cycle corresponding to the at least one synchronization shift command (804). In one configuration, the at least one synchronization shift command is received only in the N subframes selected from a group of downlink receiving opportunities consisting of approximately immediately after the synchronization shift is adjusted or approximately immediately before the synchronization shift is adjusted. In one configuration, the at least one synchronization shift command is received only in downlink receiving subframes immediately after the synchronization shift is adjusted. In one configuration, the at least one synchronization shift command is received only in downlink receiving subframes immediately before the synchronization shift is adjusted. In one configuration, the method further includes receiving an uplink synchronization frequency (806). The uplink synchronization frequency indicates a frequency for adjusting the synchronization shift (806). In one configuration, the method further includes receiving information on whether the at least one synchronization shift command should be received after or before the synchronization shift is adjusted, receiving an indication of a value of the integer N, and/or receiving non-control data instead of a synchronization shift command in subframes other than the N subframes (808).

Figure 9:
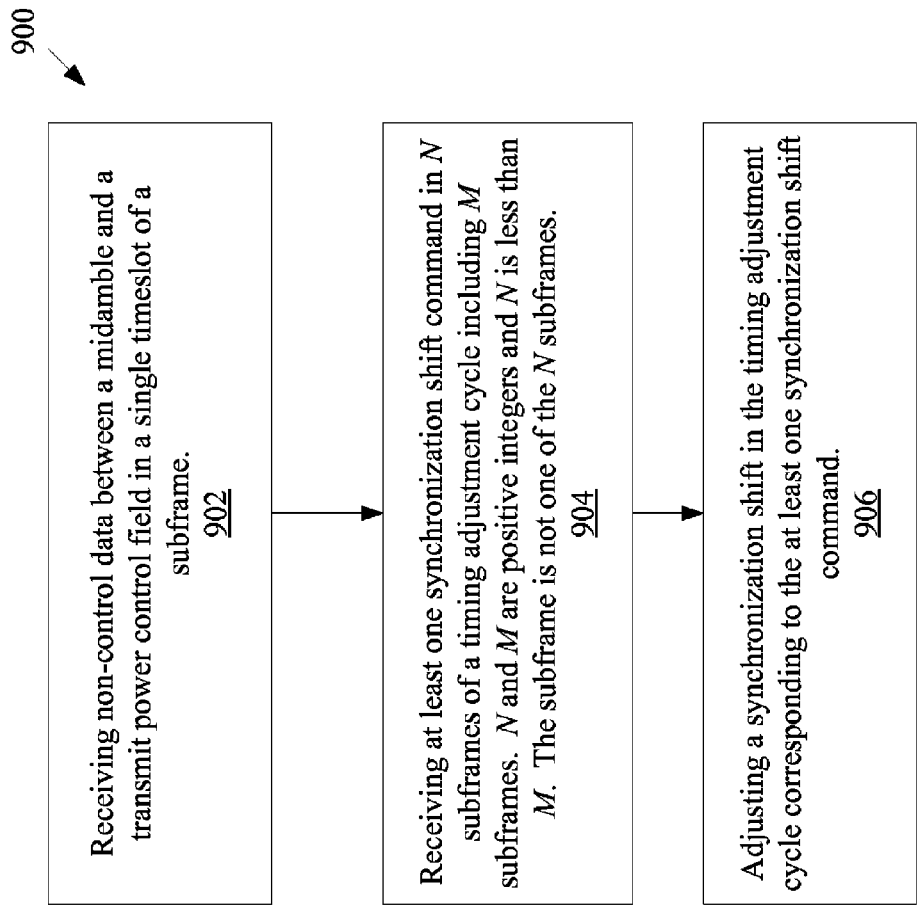
FIG. 9 is yet another flow chart of an exemplary method of wireless communication.

FIG. 9 is yet another flow chart 900 of an exemplary method of wireless communication. The method includes receiving non-control data between a midamble and a transmit power control field in a single timeslot of a subframe (902). The method may further include receiving at least one synchronization shift command in N subframes of a timing adjustment cycle including M subframes (904). N and M are positive integers and N is less than M (904). The subframe is not one of the N subframes (904). In one configuration, the method further includes adjusting a synchronization shift in the timing adjustment cycle corresponding to the at least one synchronization shift command (906). In one configuration, the at least one synchronization shift command is received only in the N subframes selected from a group of downlink receiving opportunities consisting of approximately immediately after the synchronization shift is adjusted or approximately immediately before the synchronization shift is adjusted.

In one configuration, the apparatus 350 for wireless communication includes means for receiving a signal associated with a frequency for adjusting timing and means for adjusting the timing based on the frequency. The frequency is less than once every 8 subframes. In another configuration, the apparatus 350 includes means for receiving at least one synchronization shift command in N subframes of a timing adjustment cycle including M subframes. N and M are positive integers and N is less than M. In the configuration, the apparatus 350 further includes means for adjusting a synchronization shift in the timing adjustment cycle corresponding to the at least one synchronization shift command. In yet another configuration, the apparatus 350 includes means for receiving non-control data between a midamble and a transmit power control field in a single timeslot of a subframe and means for receiving at least one synchronization shift command in N subframes of a timing adjustment cycle including M subframes. N and M are positive integers and N is less than M. The subframe is not one of the N subframes. The aforementioned means is the controller/processor 390, the transmit processor 380, and the receive processor 370 configured to perform the functions recited by the aforementioned means.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving, at a user equipment (UE), a synchronization shift command in a timeslot of a
      subframe of a time division duplex (TDD) wireless communication system, the synchronization shift command indicating whether an adjustment of a future synchronization time is to an earlier synchronization time in a future timing adjustment cycle, or to a later synchronization time in the future timing adjustment cycle, or no synchronization time shift in the future timing adjustment cycle, the future synchronization time being an uplink synchronization time for transmitting by the UE, and wherein the adjustment of the future synchronization time is relative to a current synchronization time in a current timing adjustment cycle;
   receiving, at the UE, a message comprising an uplink synchronization frequency indicating how frequently the synchronization time will be adjusted during at least one future timing adjustment cycle by the synchronization shift command of the TDD wireless communication system; and
   adjusting the future synchronization time based on the uplink synchronization frequency, the uplink synchronization frequency being increased to more than once in a future timing adjustment cycle of the at least one future timing adjustment cycle.

2. The method of claim 1, further comprising receiving additional synchronization shift commands in the current timing adjustment cycle, said synchronization shift command also being received in said current timing adjustment cycle, said synchronization shift command and said additional synchronization shift commands being a same command value.

3. The method of claim 1, wherein the adjusting the synchronization time comprises adjusting the synchronization time based at least in part on the synchronization shift command once every M subframes, which corresponds to the uplink synchronization frequency, where M is greater than 8.

4. An apparatus for wireless communication, comprising:
at least one processor; and
a memory coupled to the at least one processor, wherein the at least one processor is configured to:
receive a synchronization shift command in a timeslot of a subframe of a time division duplex (TDD) wireless communication system, the synchronization shift command indicating whether an adjustment of a future synchronization time is to an earlier synchronization time in a future timing adjustment cycle, or to a later synchronization time in the future timing adjustment cycle, or no synchronization time shift in the future timing adjustment cycle, the future synchronization time being an uplink synchronization time for transmitting by the UE, and wherein the adjustment of the future synchronization time is relative to a current synchronization time in a current timing adjustment cycle;
receive a message comprising an uplink synchronization frequency indicating how frequently the synchronization time will be adjusted during at least one future timing adjustment cycle by the synchronization shift command of the time division duplex (TDD) wireless communication system; and
adjust the future synchronization time based on the uplink synchronization frequency, the uplink synchronization frequency being increased to more than once in a future timing adjustment cycle of the at least one future timing adjustment cycle.

5. The apparatus of claim 4, wherein the at least one processor is further configured to receive additional synchronization shift commands in the current timing adjustment cycle, said synchronization shift command also being received in said current timing adjustment cycle, said synchronization shift command and said additional synchronization shift commands being a same command value.

6. The apparatus of claim 4, wherein to adjust the synchronization time, the at least one processor is configured to adjust the synchronization time based at least in part on the synchronization shift command once every M subframes, which corresponds to the uplink synchronization frequency, where M is greater than 8.

7. An apparatus for wireless communication, comprising:
means for receiving a synchronization shift command in a timeslot of a subframe of a time division duplex (TDD) wireless communication system, the synchronization shift command indicating whether an adjustment of a future synchronization time is to an earlier synchronization time in a future timing adjustment cycle, or to a later synchronization time in the future timing adjustment cycle, or no synchronization time shift in the future timing adjustment cycle, the synchronization time being an uplink synchronization time for transmitting by the UE, and wherein the adjustment of the future synchronization time is relative to a current synchronization time in a current timing adjustment cycle;
means for receiving, at the UE, a message comprising an uplink synchronization frequency indicating how frequently the synchronization time will be adjusted during at least one future timing adjustment cycle by the synchronization shift command of the time division duplex (TDD) wireless communication system; and
means for adjusting the future synchronization time based on the uplink synchronization frequency, the uplink synchronization frequency being increased to more than once in a future timing adjustment cycle of the at least one future timing adjustment cycle.

8. The apparatus of claim 7, further comprising means for receiving additional synchronization shift commands in the current timing adjustment cycle, said synchronization shift command also being received in said current timing adjustment cycle, said synchronization shift command and said additional synchronization shift commands being a same command value.

9. The apparatus of claim 7, wherein the means for adjusting the synchronization time adjusts the synchronization time based at least in part on the synchronization shift command once every M subframes, which corresponds to the uplink synchronization frequency, where M is greater than 8.

10. A computer program product, comprising:
a non-transitory computer-readable medium comprising code for:
receiving, at a user equipment (UE), a synchronization shift command in a timeslot of a subframe of a time division duplex (TDD) wireless communication system, the synchronization shift command indicating whether an adjustment of a future synchronization time is to an earlier synchronization time in a future timing adjustment cycle, or to a later synchronization time in the future timing adjustment cycle, or no synchronization time shift in the future timing adjustment cycle, the synchronization time being an uplink synchronization time for transmitting by the UE, and wherein the adjustment of the future synchronization time is relative to a current synchronization time in a current timing adjustment cycle;
receiving, at the UE, a message comprising an uplink synchronization frequency indicating how frequently the synchronization time will be adjusted during at least one future timing adjustment cycle by the synchronization shift command of the time division duplex (TDD) wireless communication system; and
adjusting the future synchronization time based on the uplink synchronization frequency, the uplink synchronization frequency being increased to more than once in a future timing adjustment cycle of the at least one future timing adjustment cycle.

* * * * *